Patented May 12, 1953

2,638,441

UNITED STATES PATENT OFFICE 2,638,441

PROCESS OF CONTACTING HYDROCARBON MIXTURES WITH ANTIMONY TRICHLORIDE

Alan C. Nixon, Berkeley, and Carl H. Deal, Jr., Alameda, Calif., assignors to Shell Development Company, San Francisco, Calif., a corporation of Delaware No Drawing. Application October 3, 1949, Serial No. 119,392

8 Claims. (Cl. 202—39.5)

The present invention relates to methods wherein certain metallic halides are contacted with organic compounds, and particularly at elevated temperatures. More particularly, it relates to a process wherein certain polyvalent metal halides are contacted in the liquid state with hydrocarbon mixtures at elevated temperatures, such as in extractive distillation of hydrocarbon mixtures in the presence of antimony trichloride as selective solvent.

It is often commercially desirable to contact various organic compounds, particularly hydrocarbons, and mixtures thereof, with certain poly- (more than di-)valent metal halides under conditions such that the metal halide remains essentially unchanged, except possibly for the formation of some molecular complex, but under which conditions and in which surroundings the metal halide tends to undergo decomposition, although such decomposition may be at a relatively low rate. Some such instances are the use of antimony trichloride in an extractive distillation for the separation of aromatic from non-aromatic hydrocarbons; the recovery of Friedel-Crafts type catalysts, including hydrocarbon complexes thereof, from hydrocarbons by distillation of the hydrocarbons therefrom; and the use of molten antimony trichloride at an elevated temperature, particularly above about 130° C., for the solvent extraction and refining of heavier petroleum oil fractions, including molten wax mixtures.

It is, therefore, a principal object of the present invention to provide a method for contacting polyvalent metal halides with organic substances while at the same time minimizing undesirable decomposition of the metal halide.

A more specific object is to provide a method for the stabilization of the metallic tri- and tetra-halides, particularly in substantially anhydrous systems and under conditions whereat they are contacted with organic substances and are normally substantially stable but subject to a low rate of decomposition.

A specific object of the invention is to substantially reduce the rate of decomposition of liquid antimony trichloride in distillation separation processes for mixtures of hydrocarbons. A concomitant object is to minimize corrosion of ferrous metal vessels of the indicated contacting systems produced by products of decomposition of the metal halide. These objects will be better understood and others will become apparent from the detailed description of the invention hereinafter.

Now, it has been found that the decomposition of the polyvalent metal halides, when subjected to conditions and to contact with organic materials such that only a relatively low rate of decomposition occurs, may be materially reduced, by the incorporation therewith of a small proportion of an organic basic nitrogenous substance.

In general, the present invention provides an improved process for contacting metallic poly-, particularly tri- and tetra-, halides with an organic material, especially mixtures of hydrocarbons, such as in extractive distillation, under conditions such that the metallic halide is recoverable as such from the contact mixture, wherein the process is carried out in the presence of a minor proportion of an organic basic nitrogenous substance. Only a relatively small amount of the nitrogenous substance is required, such as from about 0.1% to 5% by weight of the metal halide, from about 0.5% to 3% giving satisfactory results.

Particularly suitable nitrogenous substances for use in the practice of the invention are the unsubstituted organic amines, including the primary, secondary and tertiary amines (also poly amines and quaternary ammonium bases) which may be acyclic or cyclic (alicyclic and aromatic), the cyclic compounds being either homocyclic or heterocyclic in character. Substituted hydrocarbon amines are entirely satisfactory when selected such that any substituent group thereof does not interact chemically with the metal halide, which, in general, will depend on the particular metal halide involved. The halo-substituted hydrocarbon amines are suitable for use with any of the metal halides. Generally, the oxy-substituted amines, and particularly the C-hydroxy amines, the ether amines and the N-acyl amines (amides) are satisfactory for use in the invention.

The basic nitrogenous substance is preferably selected to be compatible with the liquid phase of the system with which it is used and under the conditions of operation of said system. Accordingly, in the general processing of hydrocarbon mixtures in the presence of metal polyhalides, it is preferred to utilize as agents of this invention compounds containing a total of from about 6 to about 30 carbon atoms, from about 6 to about 18 being particularly suitable.

The following are representative specific substances suitable for the practice of the invention: octyl amine, stearyl amine, oleyl amine, dihexylamine, piperidine, morpholine, piperazine, diethanolamine, tributylamine, dimethyl hexylamine, hexamethylene tetramine, pyrrole, pyridine, quinoline, isoquinoline, tetraethylene diamine, triethylene diamine, aniline, toluidine, p-chloroaniline, acetamide and acetanilide.

The present invention is applicable to various systems wherein organic materials, particularly hydrocarbon mixtures, and especially those containing substantial proportions of aromatic hydrocarbons, are contacted with a Friedel-Crafts type of metal polyhalide, such as the various halides, and particularly the chlorides and bromides, of metals such as aluminum, antimony, arsenic, boron, ferric tantalum and tin.

The advantages in the practice of the present invention will be further shown by the following examples:

EXAMPLE I

A petroleum hydrocarbon fraction, containing for the most part a mixture of $C_8$ aromatic hydrocarbons, i. e. the xylenes and ethyl benzene, and some non-aromatic hydrocarbons having the same boiling range, was heated under reflux conditions at a temperature of about 200° C. in a glass vessel and in the presence of a carbon steel strip of metal, in the presence of liquid antimony trichloride, in the weight proportion of 9 parts of $SbCl_3$ to 1 part of hydrocarbon fraction, as in an extractive distillation for the separation of components of the fraction, antimony trichloride exhibiting a selectivity between ethyl benzene and the xylene isomers. Upon analysis, it was determined that the antimony trichloride had decomposed over the first 20 hours of the run at the rate of about 0.3% per hour; over the second 20 hours the average rate had increased by about 100% over the average rate for the first 20 hours. The carbon steel strip was found to have corroded at the rate of about 74 mils per year. Substantially the same results for the rate of decomposition were obtained in the absence of any metal, being 0.31% per hour for the first 20 hours and 0.62% for the second 20 hours.

When antimony trichloride alone was similarly heated at 215° C. in contact with carbon steel the average rate of decomposition for the first 20 hours was only 0.026% per hour; during the second 20 hours it was only about 0.01% per hour, a reduction of over 50%. The rate of corrosion of the carbon steel was 9 mils per year.

When antimony trichloride was heated alone in a glass vessel at about 225–230° C., the average rates of decomposition were found to be: 0–20 hours, 0.074% per hour; 20–40 hours, 0.015% per hour; 40–60 hours, 0.012% per hour; 60–80 hours, 0.008% per hour.

EXAMPLE II

The same operation as described in the first paragraph of Example I was repeated, except that about 1.0% by weight of tributylamine, based on the weight of the $SbCl_3$, was introduced into the refluxing zone. Upon analysis, the following rates of decomposition of the antimony trichloride were found: 0–20 hours, 0.06% per hour; 20–40 hours, 0.03% per hour; 60–80 hours, 0.02% per hour. The rate of corrosion of the metal strip was about 12 mils per year.

EXAMPLE III

The operation of Example II was repeated except that 1.0% of quinoline was used in place of the tributylamine. The corresponding average rates of decomposition of the antimony trichloride were: 0–20 hours, 0.032% per hour; 20–40 hours, 0.017% per hour; 60–80 hours, 0.015% per hour.

EXAMPLE IV

Example II was repeated but with the addition of 1% water together with the 1% tributylamine and operation at 160° C., the rate of decomposition of the $SbCl_3$ was not detectable to a thousandth of one per cent per hour up to 80 hours of test. From 80 to 160 hours the rate was only about 0.015% per hour. The corrosion rate for a test of 147 hours was only 21 mils per year.

EXAMPLE V

Example II was repeated except for the replacement of the tributylamine with various other nitrogenous substances. The results of the runs are tabulated in the table, together with identification of the particular stabilizing agent.

TABLE

Stabilization of $SbCl_3$ in presence of hydrocarbons

| Stabilizing Agent | Decomposition Rate of $SbCl_3$, percent/hr., at various time intervals in hrs. | | | | | Corrosion Rate, mils/year |
|---|---|---|---|---|---|---|
| | 0–20 | 20–40 | 40–60 | 60–80 | 80–160 | |
| Diphenylamine, 1% | 0.051 | 0.006 | | | | 17 |
| α-Naphthylamine, 1% | 0.11 | 0.026 | 0.021 | | | |
| Hexamethylenetetramine, 1% | 0.017 | 0.022 | 0.027 | | | |
| Diethanolamine, 1% | 0.013 | 0.05 | 0.03 | | | |
| Acetamide, 1% | 0.10 | 0.028 | 0.019 | 0.016 | | 15 |
| Acetanilide, 1% | 0.056 | 0.024 | 0.010 | 0.012 | 0.010 | 17 |
| Urea, 1% | 0.000 | 0.000 | | | | |
| Benzotriazole, 1% | 0.036 | 0.000 | 0.000 | 0.000 | | 23 |
| Azobenzene, 1% | 0.057 | 0.057 | | | | 27 |
| Stearylamine, 1% | 0.039 | 0.029 | 0.031 | | | |
| None | 0.31 | 0.62 | | | | 74 |

EXAMPLE VI

When a small proportion (1% by weight of the antimony trichloride used) of stearylamine or oleylamine is employed with liquefied antimony trichloride in the solvent extraction of a lubricating oil distillate fraction to extract the more polar components thereof, including aromatic hydrocarbons, sulfur compounds and oxidized compounds, the rate of decomposition of the solvent antimony trichloride is reduced substantially, in the order of 50% of the decomposition experienced in normal operation.

EXAMPLE VII

The rate of decomposition of a solvent- and refining-mixture of molten antimony trichloride and aluminum trichloride at a temperature of 100° C. or higher in the contact refining therewith of waxy materials, such as short residue petroleum wax fraction, is reduced in the order of 50% by the incorporation therewith of 0.5% to 3%, suitably 1% by weight of stearylamine.

EXAMPLE VIII

In the separation of unreacted hydrocarbons from aluminum chloride, utilized in a Friedel-Crafts alkylation of an aromatic hydrocarbon with an alkylating aliphatic hydrocarbon, by distillation to remove the hydrocarbons, the decomposition of the aluminum chloride, whether as such or as a complex with the usual promoters or with an aromatic hydrocarbon, is reduced substantially by the incorporation therewith of about 1% of tributylamine or of pyridine.

The foregoing examples demonstrate the utility of the present invention and the advantages to be secured from its use. Although the tests in many of the specific examples were made in the presence of carbon steel, similar advantages are obtained when other metals are employed; tests show similar results for copper, nickel and Monel metal. Carbon steel, of course, has advantages of lower cost and availability.

We claim as our invention:

1. In the extractive distillation of a hydrocarbon mixture comprising lower alkylaromatic hydrocarbons and non-aromatics of similar boiling range, in the presence of antimony trichloride as a selective solvent, the improvement which comprises reducing substantially the decomposition of the antimony trichloride by effecting the extractive distillation in the presence of between about 0.5% and about 3% by weight, based on the antimony trichloride, of an organic basic nitrogenous compound.

2. The process in accordance with claim 1 wherein the nitrogenous compound is an aliphatic amine.

3. The process in accordance with claim 1 wherein the nitrogenous compound is tributylamine and is used in an amount of about 1% by weight of the antimony trichloride.

4. The process in accordance with claim 1 wherein the nitrogenous compound is stearylamine.

5. The process in accordance with claim 1 wherein the nitrogenous compound is quinoline.

6. The process in accordance with claim 1 wherein the nitrogenous compound is diethanolamine.

7. In a process wherein a petroleum hydrocarbon fraction containing for the most part a mixture of $C_8$ aromatic hydrocarbons having substantially similar boiling points is heated under reflux conditions in contact with a ferruginous material and in the presence of liquid antimony trichloride in order to effect a partial separation of the components of said fraction, the improvement comprising reducing substantially the decomposition of the antimony trichloride by carrying out the above-described heating in the presence of about 1% by weight of urea based on the antimony trichloride.

8. In a process wherein a petroleum hydrocarbon fraction containing for the most part a mixture of $C_8$ aromatic hydrocarbons having substantially similar boiling points is heated under reflux conditions in contact with a ferruginous material and in the presence of liquid antimony trichloride and a minor amount of water of the order of 1% by weight, based on the antimony trichloride, in order to effect a partial separation of the components of said fraction, the improvement which comprises reducing substantially the decomposition of the antimony trichloride by carrying out the above-described heating in the presence of about 1% by weight of tributylamine based on the antimony trichloride.

ALAN C. NIXON.
CARL H. DEAL, Jr.

References Cited in the file of this patent

UNITED STATES PATENTS

| Number | Name | Date |
| --- | --- | --- |
| 2,043,257 | Missbach | June 9, 1936 |
| 2,246,257 | Kohn | June 17, 1941 |
| 2,258,578 | Chesley | Oct. 7, 1941 |
| 2,290,636 | Deanesly | July 21, 1942 |
| 2,290,654 | Sutherland | July 21, 1942 |
| 2,357,028 | Shiras et al. | Aug. 29, 1944 |
| 2,407,820 | Durrum | Sept. 17, 1946 |